Feb. 2, 1965  A. M. ZALKIND  3,167,817
BLOW MOLD INSERTS FOR MOLDING CAVITIES
Filed April 13, 1962  2 Sheets-Sheet 1
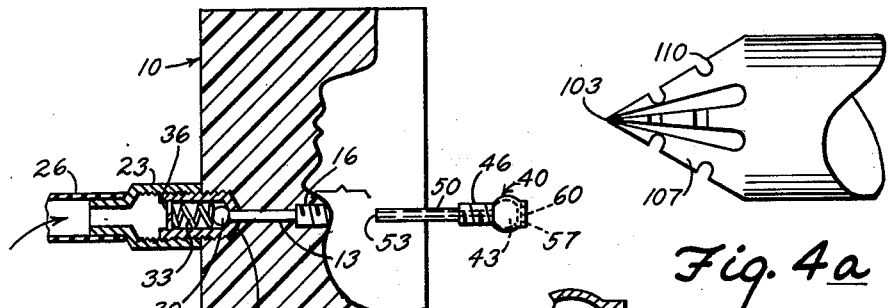
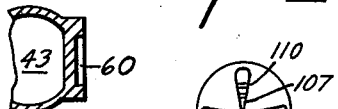
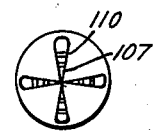
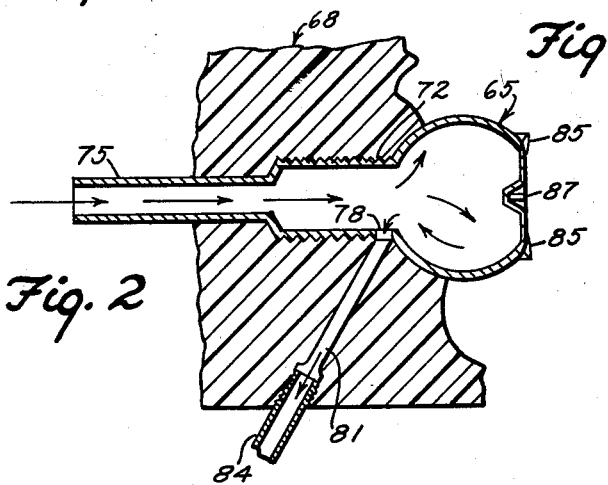
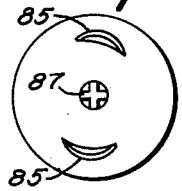
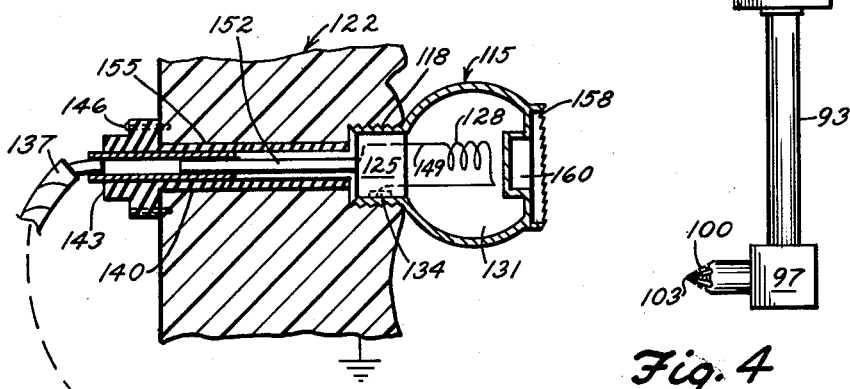
INVENTOR Feb. 2, 1965  A. M. ZALKIND  3,167,817
BLOW MOLD INSERTS FOR MOLDING CAVITIES
Filed April 13, 1962  2 Sheets-Sheet 2

INVENTOR
Albert M Zalkind

United States Patent Office 3,167,817
Patented Feb. 2, 1965

3,167,817
BLOW MOLD INSERTS FOR MOLDING CAVITIES
Albert M. Zalkind, Arlington, Va., assignor, by mesne assignments, to Jacoby-Bender, Inc., Woodside, N.Y., a corporation of New York
Filed Apr. 13, 1962, Ser. No. 187,344
10 Claims. (Cl. 18—34)

This invention relates to blow molding, and more particularly to the blow molding of doll heads having cavities for receiving doll eyes.

One of the difficulties in the use of blow molding for so-called soft doll heads made of polyethylene, is due to the lack of elasticity of the plastic material. Accordingly, in order to mold an undercut configuration such as a cavity for accommodating a doll eye unit, for example, of the sleeping doll type, it is necessary to use a removable insert or block which is attached to the mold. After the blow molding operation, the rear of the molded cavity, accessible from the interior of the doll head, is then cut away and the insert extracted from the relatively large aperture effected by cutting away of the rearmost material. Since such aperture is larger than the aperture of the cavity at the doll face, the plug may be readily removed therefrom and the stretching of the material at the rear portion does not seriously effect the ability of the cavity to a grip a doll eye unit. On the other hand, were the insert to be pulled out of the molded head through the front aperture, the material would be stretched beyond usable shape and due to the limited elasticity would not resume the proper eye aperture shape, as originally molded. In a prior application of Harry Brudney et al., Serial Number 117,061, now abandoned, means are shown for providing a cutting edge at the rear of the insert so that by proper application of exterior pressure the rear portion of the plastic material may be cut away and the insert thus exposed for removal. The present invention has for its object an improved arrangement for effecting the cutting and ready removal of the insert. Another purpose of the present invention is to provide means for ensuring proper temperature of the insert in accordance with that required for the particular material being molded, so as to ensure proper plasticity of such material in the course of molding.

The invention has several objects and features, all for the advantageous realization of those described above, and such objects and features will be apparent in the detailed description given below.

Briefly, for the purpose of effecting ready removal of the insert, I provide an insert which is threaded into the mold for securement thereto, and which can be readily rotated in the opposite direction, for removal. For purpose of quick and easy removal, the insert is provided with a suitable slot, kerf, or other means for the reception of a screwdriver bit. Such screwdriver bit may be sharpened to abrade or otherwise cut away the small area of material molded over the kerf or to pierce such material. Further, the bit is powered by an electric motor operating through suitable gearing and a right angle drive so that the bit can be moved into the molded doll head through the neck opening to engage the kerf and rotate the insert so that it will back out of the mold. By providing such insert with cutting edges at its rear, the reverse movement of the insert feeds the rotating cutting edges into the rear portion of the plastic material to thus cut away that portion.

For the purpose of maintaining proper temperature of the insert, it is constructed in most forms of the invention as a substantially hollow body into which hot water, steam, hot oil, or other suitable fluid may be directed, while it is in situ in the mold. This is of considerable advantage, in that such heating can take place rapidly and without the delay required for a pre-heating operation, and subsequent insertion of the heated insert into the mold. In fact, such heating occurs during the normal operation of the mold and does not require a separate pre-heating step in the molding process. Another form of introducing heat into the insert contemplates the use of a resistance coil built therein.

By making the insert of suitable thin walled material, the heating, either by fluid or electric current, occasions no delay and such heat may be continuously applied from the moment that the insert is threaded into the mold and during the course of the actual molding operation. Accordingly, there is no danger of cooling of the insert in the course of applying it to the mold after a separate pre-heating step prior to putting the insert in the mold and, furthermore, it is not necessary to heat the insert beyond the proper temperature in order to allow for a certain amount of cooling in the course of physical manipulation of removing the insert from a pre-heating device and inserting it in the mold. The danger and inconvenience of physical handling of a hot insert is likewise eliminated, of course. Thus, very precise temperature control can be achieved for inserts made and used in accordance with the teaching herein.

A detailed description of the invention now follows, in conjunction with the appended drawing, in which:

FIG. 1 is a longitudinal cross section showing a blow mold block and components of one form of the invention associated therewith;

FIG. 2 is a longitudinal view, in fragmentary section, showing a modified form of the invention;

FIG. 3 is an end view of the insert shown in FIG. 2;

FIG. 4 is an elevation of one form of tool for removing the insert;

FIGS. 4a and 4b show side and front views, respectively, of one form of bit for removal of the insert;

FIG. 5 is a fragmentary elevation in section showing another form of the invention;

Figure 6:
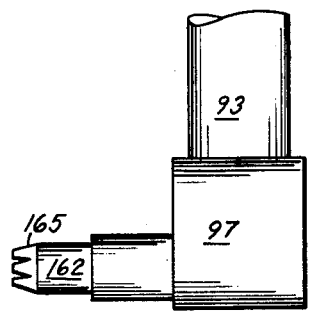
FIG. 6 is a fragmentary illustration of a tool used in conjunction with the form of invention shown in FIG. 5.

Referring now to the drawing, and particularly to FIG. 1, a mold block 10 is shown for the face portion of a doll head, which will be understood to be intended for use in a blow molding machine, and it will be further understood to be movable horizontally to and from a center portion of the machine in accordance with conventional practice in any standard type of blow molding machine. The mold block is provided with a bore 13 terminating in a screw thread 16 at its inner end, and in a threaded bushing 20 at its outer end, which bushing terminates in a fitting 23 connected to flexible hose 26. Within the bushing is a ball check valve 30 biased into seated position against the aperture of the bushing as by a spring 33 retained by a suitable split washer or other retaining device 36. Thus, it will be understood that the ball seats in the end of the bushing to prevent flow of a fluid moving in the direction of the arrow in tube 26, blocking entry of such fluid to the bore 13.

An insert 40 has a hollow chamber 43 and a threaded neck 46 extending in an elongated tube 50 having the opening 53. It will be understood that the threaded section 46 mates with the female thread 16. Thus, the insert 40 may be pushed into bore 13 until the threads meet and then by rotation of the insert the end of tube 50 unseats the ball 30.

The insert may be of single piece construction, for example cast or machined, or of composite construction. The particular form or mode of making of the insert is not critical, and it will be realized by persons skilled in the art that a great many ways of making such an insert are possible.

Once the insert has been screwed into place in the mold block, the tube 50, as explained above, opens valve 30 and permits a suitable fluid to flow into the hollow chamber 43. Such fluid may be hot water, steam, oil, or a hot gas, for example air, or any other heatable and readily flowable liquid, vapor or gas. Depending upon the thickness of the wall of the insert and the material of which the insert is made, e.g., metal or ceramic, the heating effect will be manifest on the exterior surface in a period of time which is a function of heat transmission rate. As a matter of fact, with suitable design conditions, and proper temperature of fluid, the insert will be at suitable temperature to effect plasticity of the molding material at the time, or before the normal operation of the machine effects movement of the mold block 10 against the plastic tube (not shown) to be blow molded. Thus, no delay is occasioned and, obviously, no separate handling of a hot insert is required.

After the blow molding step, removal of the insert is necessary. If the insert is large and has considerable thermal capacity due to hot gas or liquid trapped therein, it can be cooled by a cold air stream externally applied by suitable hose means (not shown) or a cooling fluid can be fed into hose 26 through a suitable multi-way valve (not shown) connected to control supply of hot or cold fluid to that hose, and having drain port for prior drainage of the insert and its passageways.

Removal is accomplished by first cutting away the rear material at the circular area 57 and insertion of a screw driver bit (not shown) in the kerf 60 provided in the end of the insert, to back out the insert.

In other forms of the invention where the insert is provided with cutting edges, as in S.N. 117,061, now abandoned, such a screwdriver bit would have a sharpened edge in order to readily cut through the material molded over the kerf so as to effect entry into the kerf. Various types of commercially known short bits used in wrenches having ratchet drives can be inserted into the doll neck for this purpose. However, I prefer to use special bits and power operation, as will be apparent in the description that follows. In any event, the cutting away may be accomplished by any suitable cutting tool, a step heretofore known, and application of the screwdriver will then back the insert out of the mold effecting closing of valve 30. It will be appreciated that the threads 16 and 46 are of sufficient fineness of fit as to preclude any leakage of fluid prior to full closing of ball valve 30. Upon removal of the insert, if a gaseous heating medium has been used, there is, of course, no need to permit run out from the hollow interior. Where, however, a liquid has been used, any residue may then be permitted to drip out of the tube 50. Likewise, if steam has been used, any condensate can be permitted to run out of the tube.

Referring now to FIG. 2, a modified version of the invention is shown contemplating a hollow insert 65 threadable into mold block 68 at the threaded section 72 and terminating in the tube 75. In this instance, the threaded section has an aperture or slot 78 registrable with a bore 81 when the insert is fully threaded into position. Bore 81 connects with an outlet fitting 84 which will be understood to connect to a flexible hose (not shown) which may run to a waste sump or tank, if a liquid heating medium is used, or into a recirculatory heating system. Where a gaseous heating medium is used, or steam, it may simply be permitted to exhaust into a trap for condensation or retrieval, or waste pipe. In any event, the heating fluid is circulatory within the insert, as indicated by the arrows. Thus, a uniform heating of the insert can be accomplished for as long a period as is desired, depending upon the nature of the blow molding operation being accomplished, without any danger that heat transmission from the inlet end of tube 75 will not be fast enough to fully heat the entire area of the insert, or maintain it fully heated as heat is lost by contact with the plastic material being molded. FIG. 2 also shows cutting edges, such as 85, integral with the end of the insert and suitably sharp and shaped so that, as the insert is rotated with plastic material molded around it, a cutting action will be realized, substantially in accordance with the aforementioned patent application.

The insert is formed with a socket type kerf, for example, a Phillips screw socket 87. A suitable power tool is shown in FIG. 4 comprising a motor 90, a drive shaft 93, a right-angle drive gearing 97, and a Phillips screwdriver bit 100. It will be understood that the motor is suitably geared for proper r.p.m. of the bit, and in this instance, it is believed that a slower than normal r.p.m. would be preferred not only to take advantage of the higher torque occasioned by the gearing ratio, in view of the cutting force required, but also to ensure against possible damage due to careless operation in applying the bit to the kerf.

Preferably, the bit is ground to a sharp point at 103, in order to pierce the plastic material covering the socket, part of which material may be expected to be molded into the socket and the flutes 107 of the bit (see FIGS. 4a and 4b) are provided with sharp edged notches 110 in order to effect a grinding or cutting away of the material over or in the socket, in order to ensure the flutes engaging sufficiently against the socket flutes to produce rotation.

It will, of course, be understood that reverse rotation is used in order to back out the insert from the mold. Due to the backing out motion, the cutting edges 85 are force fed into the rear material molded around the insert, thus cutting away such area to provide a large aperture through which the insert emerges from the molded cavity until the end of the thread is reached so that it can then be removed by hand, or the final hand removal may contemplate manually rotating the insert for the last few threads.

Referring now to FIG. 5, a form of the invention is shown utilizing electric heating of the insert 115. Thus, the insert is threaded in at 118 to the mold block 122 and has incorporated within the threaded neck a suitable ceramic insulating plug 125 which supports a resistance coil or other suitable heating unit 128 within the hollow chamber 131. One lead of the coil is suitably grounded in any feasible manner as through the metallic insert 134 in the plug whereby current may pass to ground for one leg of an electric supply line indicated as V, the other leg of which passes through an insulating cable 137 secured to a metallic resilient clip or socket 140 carried in an insulated bushing 143 suitably secured to the mold block, as by screws 146. The lead 149 of the resistance coil connects to a metallic contact rod 152 carried by the plug 125. Thus, it will be appreciated that rod 152 can protrude into socket 140 for conducting electrical current from the source through coil 128. The electrically connecting members are insulated from the mold by an insulating sleeve 155 within the bore which terminates in the threaded section at 118, as clearly seen on FIG. 5.

From the above description, it will be apparent that threading of the insert into the mold will effect movement of rod 152 into socket 140 to establish an electrical connection so that the coil 128 will be energized to effect heating of the insert in situ.

Figure 7:
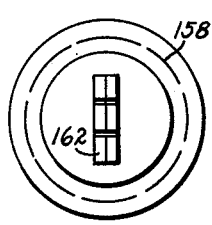
FIG. 7 is an end view of the insert of FIG. 5.
Figure 8:
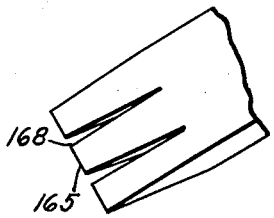
FIG. 8 is a perspective of the bit of the tool of FIG. 6.

The rear exterior portion of the insert is provided with a circular saw tooth cutting device 158 and also with a narrow kerf 160. As shown in FIGS. 6, 7 and 8, the power tool has a screwdriver bit 162 with a sharpened serrated edge 165 having sharp edged notches 168. Accordingly, the tool rotated at slow r.p.m. can simply be held against the material molded over the kerf and will grind or cut away such material until the kerf is exposed, at which time the tool can be socketed in the kerf and effect backing out of the insert. The backing out of the insert will cause cutting of the rear area of the plastic material by force feed of the circular cutting edge 158 and permit emergence of the insert from the mold cavity, as described hereinabove.

Figure 9:
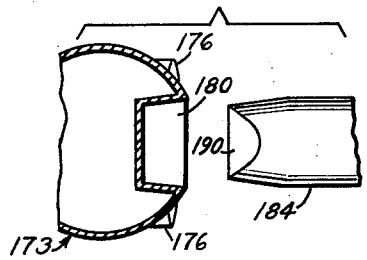
FIG. 9 is an exploded view shown in section of another form of insert and removal bit.

Referring now to FIG. 9, an insert 173 is shown at its rear portion having cutting edges, such as 176, and a slightly tapered conical bore 180. In this connection, a screwdriver bit is supplanted by a plug 184 having a corresponding taper hollow ground at its front end, and terminating in a circular sharp cutting edge 190. Thus, movement of the tapered plug against the material molded around the insert will initially cut away the material adjacent the cutting edge and will then force the periphery of the aperture thus formed to flex sufficiently to permit the tool to enter the tapered socket 180 for frictional drive in backing out the insert.

Figure 10:
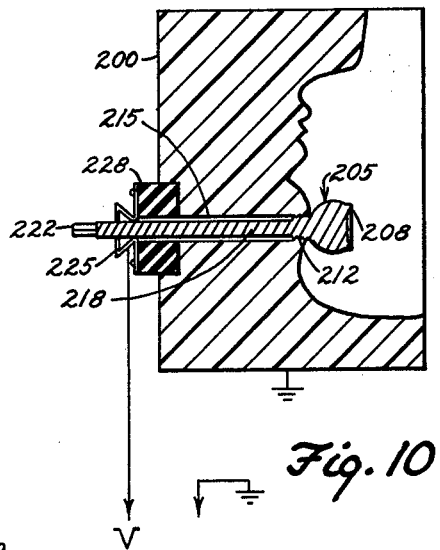
FIG. 10 is a sectional longitudinal view of a further modification of the invention.

Attention is invited to FIG. 10 showing a further modification in the invention which utilizes a mold block 200 and a mold insert 205 having circular cutting edge 208 and a threaded section 212 which engages corresponding threads in a bore 215 of the mold block. The insert has an elongated integral extension 218 which protrudes beyond the bore 215 and terminates in a square shank 222 for engagement by a wrench. A resilient contact clip 225 is secured to an insulating ring 228 carried at the rear of the mold block. The mold block is grounded to the line V and resilient contact element 225 is connected to the other side of the line. Accordingly, when the insert is in place, current will pass through the threaded section, inasmuch as the other portions of the insert do not touch the mold block. By making the insert of a sufficiently resistive material, for example, German silver, a heating effect due to the current will be produced at the threaded section, due to contact resistance of the threads and the passage of current in that region, which by its proximity to the main mass of the insert will effect heating thereof, particularly at the corners of the eye cavity molded therearound which forms the actual facial eye corners in the doll face where detail of molding is important. For rapid heating the construction can be hollow as in FIG. 1 or 2, the end of the tube being ground with a flat to take a wrench.

Figure 11:
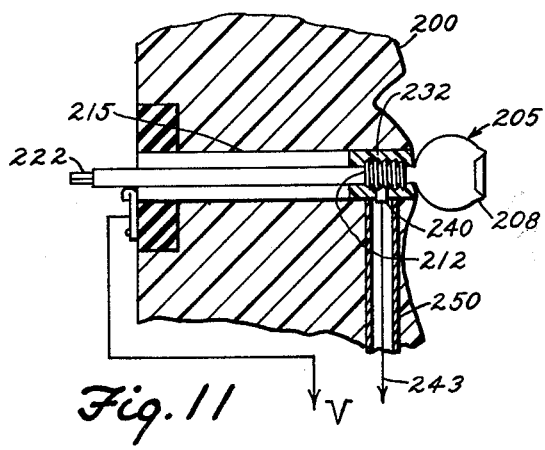
FIG. 11 is a sectional longitudinal view of a modified construction of FIG. 10.

Ungrounded circuitry could, of course, be utilized, as shown in FIG. 11, using a ceramic plug 232 internally threaded to take threaded portion 212 of insert 205, the plug being secured in passageway 215 and having a metal plug 240 connected to lead 243 passing through insulating sleeve 250 for connection to the voltage line.

Removal of the insert in either FIG. 10 or 11 is readily accomplished by applying a wrench to the square shank 222, which wrench may be manual or power operated. Thus, backing out of the insert by rotation effects cutting of the rear area of the molded material by virtue of the cutting edge 208, force fed by the movement toward the right as torque is applied.

Having thus described my invention, I am aware that many changes may be made without departing from the spirit thereof and, accordingly, I do not seek to be limited to the precise illustrations herein given, except as set forth in the appended claims.

What is claimed is:

1. The combination of an insert for molding a cavity by blow molding and a mold block, said mold block and said insert being threadedly connectable with each other for securement of said insert to said mold block, said insert having tool engaging means for engagement with a rotative tool for effecting unscrewing of said insert from said mold block, said insert having relatively fixed cutting means whereby rotation of said insert effects axial movement to force feed said cutting means into plastic material molded around said insert to cut away a portion of said material for effecting an aperture through which said insert may be removed.

2. In a device as set forth in claim 1, said combination further including a tool having means for removal of plastic material molded around said insert to effect access to said tool engaging means and having means to subsequently engage therewith.

3. The combination of a mold block and an insert for molding a cavity in plastic material, said insert and mold block having mating threaded surfaces whereby said insert may be secured to said mold block, said insert being hollow and having a tubular portion, said mold block having a bore for accommodating said tubular portion, a valve normally closing said bore wherein securement of said insert to said mold block opens said bore by engagement of said tubular portion with said valve, and means for effecting a connection to a source of hot fluid whereby said fluid may pass said open valve and be conducted through said bore and have entry into said hollow insert via said tubular portion.

4. In a device as set forth in claim 3, said insert having an exhaust port whereby fluid entering said insert may exhaust through said port.

5. A blow mold insert for blow molding a cavity in a body being molded in a mold block, means for removably securing said insert to a mold block, and means secured to said block for heating the interior of said insert when secured to a mold block, said heating means comprising an electric heating element within said insert and said insert being movable with respect to said heating element so as to be removed from said block and said heating element.

6. In a device as set forth in claim 5, said insert being hollow and having thin walls to effect rapid transmission of heat from said electric heating element to the exterior thereof.

7. The combination of blow mold and an insert therefor for molding a cavity, thread means for securing said insert to said mold, said insert having a cutting means relatively fixed with respect thereto and capable of cutting through plastic material molded therearound, said insert having drive means for drive engagement with a rotary tool to rotate said insert, whereby said insert is backed out of said mold by said thread means upon rotation of said insert and said cutting means effects cutting away of a predetermined area of said material molded around said insert.

8. In a combination as set forth in claim 7, said cutting means comprising a circularly disposed array of saw teeth.

9. The combination of a blow mold and an insert therefor for molding a cavity, said insert being hollow and having an integral tubular extension with a threaded section thereof, said blow mold having a bore for accommodating said tubular extension, said bore having a mating thread to be engaged by said threaded section for securing said insert in place, a check valve disposed for closing said bore and disposed to be moved for opening said bore by an end of said tubular extension when said insert is applied to said mold, and means for conducting heating fluid to said check valve for passage through said tubular extension into said insert when said check valve is opened by said tubular extension.

10. In a blow molding apparatus, the combination of a mold block and an insert for molding a cavity in a body being molded in said mold block, means for translating said insert relative to said mold block wherein said insert is simultaneously rotated, said insert being provided with relatively fixed cutting means whereby said rotation of said insert is operative to effect cutting of material molded therearound.

References Cited in the file of this patent

UNITED STATES PATENTS

| | | |
|---|---|---|
| 1,551,313 | Kocsis et al. | Aug. 25, 1925 |
| 1,584,193 | Rein et al. | May 11, 1926 |
| 2,331,630 | Rempel | Oct. 12, 1943 |
| 2,688,159 | Swartz et al. | Sept. 7, 1954 |
| 2,728,948 | Kallus | Jan. 3, 1956 |
| 2,830,325 | Bray | Apr. 15, 1958 |
| 2,987,771 | Catalano et al. | June 13, 1961 |
| 3,015,856 | Cohn | Jan. 9, 1962 |
| 3,109,203 | Moormann | Nov. 5, 1963 |